United States Patent
Johnson et al.

[19]

[11] Patent Number: 5,962,800
[45] Date of Patent: Oct. 5, 1999

[54] SCALE-BASED MUSIC NOTATION SYSTEM

[76] Inventors: Gerald L. Johnson, 6714 Pomona, Boise, Id. 83704; Joseph Thomas Pawlowski, 12171 W. Musket Dr., Boise, Id. 83713

[21] Appl. No.: 09/012,879

[22] Filed: Jan. 23, 1998

Related U.S. Application Data

[63] Continuation-in-part of application No. 08/646,510, May 7, 1996, abandoned.

[51] Int. Cl.⁶ .................................................. G09B 15/02
[52] U.S. Cl. ....................................... 84/483.2; 84/423 R
[58] Field of Search ............................... 84/483.1, 483.2, 84/485 R, 478, 479 A, 423 R; 434/156

[56] References Cited

U.S. PATENT DOCUMENTS

| | | | |
|---|---|---|---|
| 152,726 | 7/1874 | Cramer | 84/428 |
| 682,015 | 9/1901 | Adams | 84/483.2 |
| 733,351 | 7/1903 | Beswick | 84/483.2 |
| 1,053,366 | 2/1913 | Dickson | 84/483.2 |
| 1,313,015 | 8/1919 | Reeve | 84/483.2 |
| 1,473,495 | 11/1923 | Miller | 84/483.2 |
| 1,483,380 | 2/1924 | Reeve | 84/483.2 |
| 2,347,950 | 5/1944 | Huish | 84/478 |
| 3,680,428 | 8/1972 | Buckrucker et al. | 84/471 |
| 3,741,066 | 6/1973 | Cromleigh | 84/478 |
| 4,054,079 | 10/1977 | Sohler | 84/423 |
| 4,366,741 | 1/1983 | Titus | 84/478 |
| 4,655,117 | 4/1987 | Roose | 84/423 |
| 4,885,969 | 12/1989 | Chesters | 84/1.01 |
| 4,945,804 | 8/1990 | Farrand | 84/462 |
| 4,958,551 | 9/1990 | Lui | 84/462 |
| 5,574,238 | 11/1996 | Mencher | 84/483.2 |

FOREIGN PATENT DOCUMENTS 140130  8/1930  Switzerland.

*Primary Examiner*—William M. Shoop, Jr.
*Assistant Examiner*—Shih-Yung Hsieh
*Attorney, Agent, or Firm*—Robert L. Shaver; Frank J. Dykas

[57] ABSTRACT

A musical notation system which displays the seven notes of any chosen scale on a staff of eight lines and seven spaces, which are typically arranged in a vertical fashion, and which is a graphical representation of a keyboard. No sharps or flats are used to designate a key, but rather only the valid notes of any particular diatonic scale are provided with positions on the staff. Notations which indicate octaves, beats per measure, the selected Key and the mode are all provided. Symbols for timbre, loudness, duration of notes and rests are the same as conventional music notations.

21 Claims, 4 Drawing Sheets

SCALE-BASED MUSIC NOTATION SYSTEM

This application is a continuation-in-part of application Ser. No. 08/646,510, filed May 07, 1996, abandoned entitled SCALE BASED MUSIC NOTATION SYSTEM.

BACKGROUND OF THE INVENTION

1. Technical Field

This invention relates generally to music notation systems, and more particularly to a system method of music notation in which the staff has a direct graphical correlation to a musical instrument, such as a keyboard, and displays only the valid notes of a selected scale.

2. Background

The conventional system of music notation utilizes a staff or combinations of staves, each of which has a fundamental structure consisting of five lines and four spaces, arranged in a horizontal manner. The lines, from bottom to top, normally represent the notes E G B D F. The spaces, from bottom to top, normally represent the notes F A C E. The lines and spaces may be linearly extended toward either the top or the bottom to obtain higher or lower notes than is possible in the basic staff. Notes are displayed on this staff, with the horizontal relationship of the notes indicating their temporal relationship. The vertical placement of a note on any particular line or space indicates the pitch of the note.

It should be noted that this specification makes references to two keys. One type of key is the key which is pressed on a keyboard to sound a note. The other type of key is the Key in which the piece of music is played. The latter type of key will hereinafter be described as the Key, with a capital K.

At the upper left of the staff is a Key signature. The Key signature is a map of the scale of the selected Key. This map consists of the placement of sharp symbols or flat symbols on various lines or spaces of the staff. This notation indicates that when a note is on the sharped or flatted line or space of the staff, it is played as a sharp or a flat, as directed by the Key signature.

A scale is a listing or playing of the valid notes of any particular Key. The Key of C has no sharps or flats. The Key of G has one sharp (F). The Key of D has two sharps (F and C). The Key of F has one flat (B). The Key of B flat has two flats (B and E), etc.

An experienced music reader can tell at a glance what Key the music is written in by recognizing the pattern of sharps or flats in the Key signature.

Each line and space of the traditional musical staff represents one of the twelve semi tones of the chromatic scale. The great majority of music utilizes keys which consist of seven notes. These are called Diatonic scales.

Diatonic scales are a sub-set of the chromatic scale. A diatonic scale as used in this invention, comprises seven non-equidistant tones of an octave. The more restrictive definition, which defines a diatonic scale as consisting of five tones and two semi-tones, for a total of seven notes, is not utilized in this specification. To play the seven notes of a diatonic scale, the appropriate keys of the keyboard are depressed, and through practice and memorization, the musician knows which keys to play for a particular diatonic scale, and which keys to skip (the excess chromatic keys).

At the far left of each staff is also positioned a clef. There are three possible types of clefs; the G-clef, the C-clef, and the F-clef. The vertical position of each of these clefs on the scale indicates the pitch of a particular position on that scale. The norm is for the spiral portion of the G-clef to encircle the position of the G above middle C (the second line from the bottom), and in this position the G clef is called the treble clef. If the G-clef is located with it's spiral encircling another line or space, that line or space is assigned the G pitch. The C-clef is similarly used to define the pitch of middle C. It typically is placed on the third line or the fourth line. The F-clef locates the F below middle C and is usually positioned to indicate the fourth line, and in this position is termed the bass clef.

In the conventional music notation system, two or more staves can be displayed, and when they are connected by a brace (as shown in FIG. 1), they are termed a system. Piano music is notated using two such staves connected by a brace. The upper staff is marked with a G-clef (treble clef) on the G line, which defines that line as the G above middle C. The lower staff is marked with an F-clef (bass clef) on the fourth line which defines that line as being the F below middle C. Use of these two staves connected by a brace is termed the great or grand staff, as shown in FIG. 1. The lower staff generally indicates notes played with the left hand, and the upper staff shows notes generally played by the right hand.

The problems which arise in the traditional system of illustrating music are almost too numerous to mention. The system of using sharps and flats at the beginning of each staff can only positively identify the major scales (Keys) to the musician. Other intended scales such as minor (or natural minor), melodic minor, harmonic minor, jazz, blues, the various modes (e.g. phrygian, lydian) are not obvious.

Determining the correct note, or semi-tone, to be played is difficult because it must first be determined if the displayed note is raised or lowered by one semi-tone (as indicated by sharps and flats in the Key signature). The sharps or flats at the beginning of the staff are shown only once whereas the note alteration is done for the note regardless of where it appears on the staff. For instance, a B-flat is shown only on the middle line at the beginning of the staff but must apply to any B note, regardless of how many extension lines above or below the staff are added. The musician must be able to sight read all notes regardless of position (i.e. octave) and remember to add the sharps and/or flats to the note before playing it. The traditional system is adequate for the C-major scale (seven tones with no sharps or flats), or the chromatic scale (the twelve semi-tones of an octave). The traditional system is difficult to learn for any scale other than the chromatic scale or the C-major scale.

Some of the problems of the traditional music notation system then are knowing which Key is selected; determining which notes are to be played as flat or sharp; knowing which notes on the keyboard to skip in order to play the correct diatonic scale; and correlating the position of a note on the staff to which key on a keyboard must be played.

Accordingly, it is an object of this invention to provide a means for knowing which Key is selected. It is another object of this invention to provide a musical notation system without sharps or flats. It is another object of this invention to display a staff in which all of the positions of the staff represent valid notes of a seven note scale. It is also an object of this invention to provide a staff which has a direct graphical correlation to a keyboard, so that each note of the keyboard is represented as a space between lines on a staff.

DISCLOSURE OF INVENTION

According to the present invention, the foregoing and other objects and advantages are attained by a music notation system for displaying the notes of a musical score, which is combined with a keyboard. The Key of the selection is displayed to the user. This music notation system comprises a staff which has a recognizable pattern of positions for the display of notes. The staff is constructed so that there are only positions for the valid notes of any particular scale. The valid notes of each scale are placed adjacent to one another on this scale, unlike in the chromatic scale in which spaces between valid notes of a scale exist. The staff of the invention corresponds to a keyboard which utilizes a repeating pattern of keys and is programmed to play only valid notes of a selected musical scale.

In accordance with another aspect of the invention, the music notation system for displaying selected notes of selected musical scales comprises a staff which has a recognizable pattern of seven positions for the adjacent and consecutive display of only the seven valid notes of a selected musical scale. The unique features of this scale include the fact that there are positions only for the valid notes of a seven note scale, each position of a valid note is adjacent to the other positions, and every position has a valid note. This is unlike the chromatic scale in which there are certain positions that for any particular scale will not have a valid note, but instead that note will be skipped when played on the keyboard. This choice of seven positions for notes is based upon the most common scales, which consist of seven of the twelve chromatic semi-tones. In this music system, only the seven valid notes of any particular seven note scale are displayed, and those notes of the chromatic scale which are skipped and not appropriate for the scale are not displayed, nor do they have a position for display. The seven note staff corresponds to a seven note keyboard, in which a repeating pattern of seven keys is programmed to play only the seven valid notes of the selected diatonic musical scale.

In another mode of the current invention, the music notation system has the feature that if a musical scale of less than seven notes is selected, the notes of that scale can be displayed on the seven position staff of the scale-based music notation system. For example, the notes of a pentatonic scale can be positioned on the seven position staff. In that case, some of the available positions are not utilized. Five note scales can be similarly displayed on the scale-based music notation system staff. These five and six note staffs correspond to a keyboard in which five and six keys are programmed to sound the five or six valid notes of five or six note scales.

In the music notation system of this invention, the staff consisting of seven positions for valid notes can be oriented horizontally. In this mode, the vertical placement of each note indicates the pitch of the note. In this mode, the horizontal placement of each note indicates the temporal relationship of the note.

In another mode of the current invention, the staff of the music notation system can be oriented vertically. In this mode, the vertical placement of each note indicates its temporal relationship with the other notes, and the horizontal placement of each note indicates the pitch of the note.

In accordance with another aspect of the invention, the staff of the music notation system consists of seven positions for displaying the valid notes of a scale, with the staff itself graphically representing a keyboard which has a repeating pattern of seven notes. The type of keyboard which the music system graphically represents is a keyboard comprised of repeating recognizable patterns of seven keys. The seven keys may be of two types of keys, for instance, black keys and white keys, or other colors may be used, or representations of keys may be used, such as on a computer screen. In the music notation system of this particular mode, each of the seven positions of the staff would represent one of the seven keys of a sequence of seven keys on such a keyboard. Since the keyboard contains a plurality of these groups of seven keys, the music notation system would display a notation which indicates which of these groups of seven keys is represented, i.e., the octave. In the music notation system of this mode, the seven positions of the musical staff are distinctively marked to correspond to the types of keys of the keyboard. For instance, if the keyboard consists of black and white keys, the corresponding positions of the staff could be denoted as gray and white. Other distinctive markings are possible, as long as the positions of the staff correlate to types of keys on the keyboard.

In this mode of music notation system, a notation is provided which indicates to the user the selected scale or Key of the musical piece. The indication of the scale or Key can be by indicating the root note of the scale. Such a notation would indicate that the selected Key is A, B, C, D, etc. In this mode of music notation system, more than one octave can be displayed. This is achieved by placing staves side by side with an indication to the user as to which octave each stave represents. This mode of music notation system also would be provided with a way to indicate to the user the selected mode of the piece. This indication would be most readily visible if placed with the indication for the Key. Thus, the user would see that the piece was to be played in the Key of C in a major mode, by the display of the term C Maj. The music system of this mode also is provided with a way of indicating to the user the number of beats per measure of the musical piece. This would be displayed to the user as a four/four or three/four, etc. to indicate four beats per measure, or three beats per measure. The notation of beats per measure, as well as the notation for the duration of notes, their timbre, and their loudness utilizes the same notation as the conventional notation system.

Each of the aspects of the invention described above can also be described as a method of representing music notation, or a process of representing keyboard structure with a graphical display in a music notation system or staff. In the invention a sheet of music is utilized for the display of the graphical representation of a corresponding keyboard. The sheet of music forms an apparatus for displaying the music notation system. The apparatus thus formed can be used as an apparatus for teaching and learning the playing of a keyboard instrument as described above, and for teaching and learning a method of reading music and playing a recorded piece of music.

The applicant's invention, by displaying only the valid notes of diatonic scales, and by displaying those notes on a graphical representation of a keyboard, greatly simplifies the reading and playing of music. Sight reading is greatly simplified. There is a direct correspondence between the keys of the diatonic keyboard and the visual representation of diatonic music. Correct association occurs even without the ability to read notes. The use of sharps and flats is eliminated in the identification of the Key and the mode. This eliminates the mental calculation required for the carrying of flats and sharps through a whole piece of music. Tablature for an instrument created around a seven-note scale (or six or five) is greatly simplified. Since the staff is a graphical representation of a keyboard, when the note appears on the staff, no mental translation is required by the user to determine which key of the keyboard is depressed. The only further information required is to indicate which finger of the hand is to be used to play the indicated key. This is because the lines and spaces of the staff have a direct relationship to the keys of a keyboard instrument which is designed to play diatonic scales. Other instruments similarly created have the same advantage when used with the staff of the musical notation system.

Still other objects and advantages of the present invention will become readily apparent to those skilled in this art form from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT INVENTION

Figure 4:
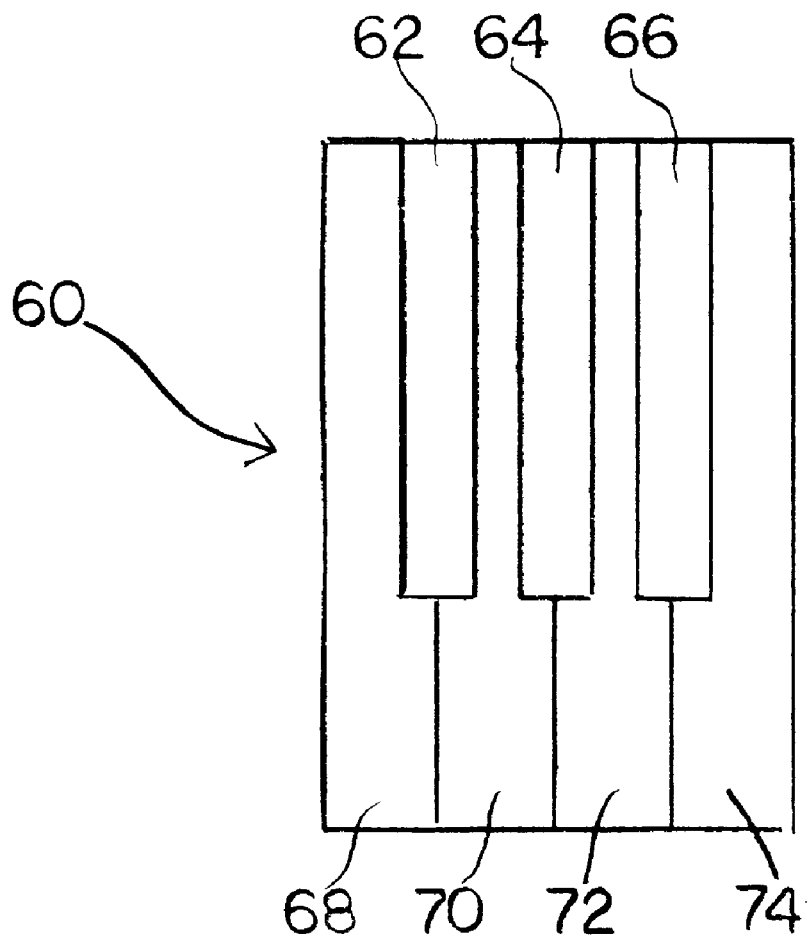
FIG. 4 shows a keyboard with seven (7) keys.

A chorded electronic musical instrument of the type that can best be used with the scale-based notation system is described in the patent application of the inventors, Simplified Keyboard and Electronic Musical Instrument, Johnson and Pawlowski, filed Apr. 10, 1996, as application Ser. No. 08/623,485 incorporated herein by reference. In this type of musical instrument, the keys of the keyboard are arranged in repeating patterns of seven keys, for instance four white keys and three black keys, as shown in FIG. 4. The user selects the Key in which the musical piece is to be played, and the instrument assigns the appropriate pitches to the seven keys of each octave, so that each of those seven key octaves play the seven valid notes of the selected diatonic scale. If a scale is selected which has fewer than seven notes, such as six or five notes, the instrument optionally mutes the excess keys or repeats the preceding note value.

Figure 1:
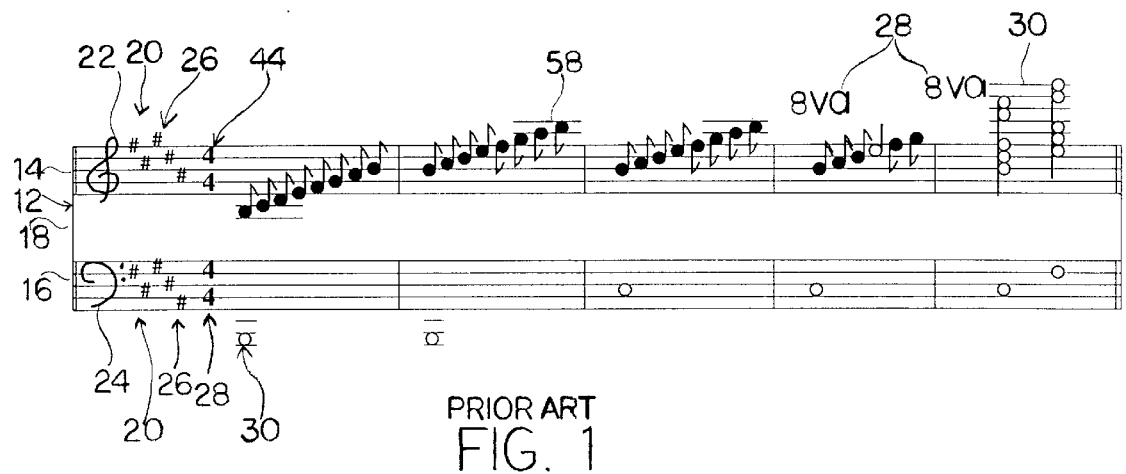
FIG. 1 shows a prior art traditional music staff, using the traditional music notation system.

In order to best understand the best mode of the present invention, a description of the prior art music notation system is first required. FIG. 1 shows a grand staff 12, the common music notation system for use by piano or keyboards. The grand staff consists of a treble staff 14 and a base staff 16 connected by a bridge 18. Key signature 20 consists of G clef 22 on the treble staff and F clef 24 on the bass staff, sharps 26 in both staves and timing notation 44 in both staves. The G clef defines the second line as the G above middle C. The F clef defines the fourth line as the F below middle C. Octave notation 28 indicates the octave of the notes displayed. Lines are added below or above the octave at 30 to display notes which are not contained within the normal staff.

Figure 2:
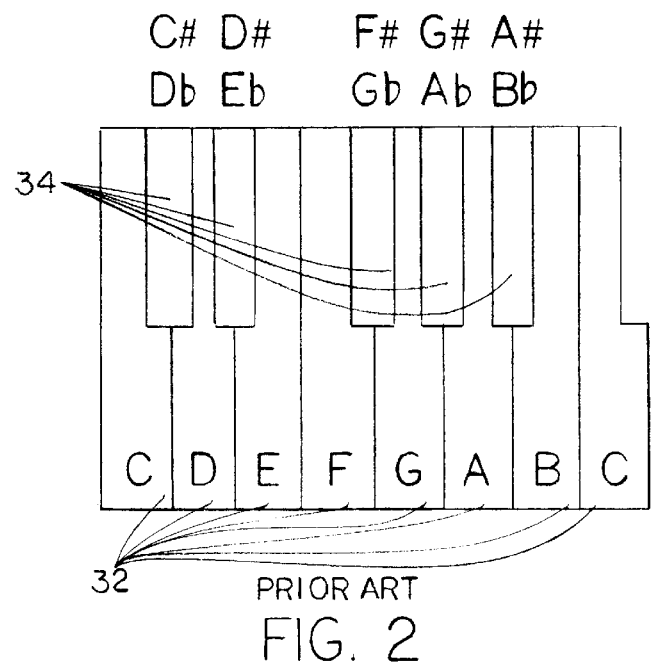
FIG. 2 shows the traditional prior art keyboard arrangement.

The position of the G and the F clefs defines the pitch of a certain line on the treble and bass staff, and thereby establishes the pitch of every other line and space in the staves. The location of the sharps 26 or flats on the lines and spaces of the staves indicate to a reader that if a note is positioned on that line or space, in that octave or in other octaves, that note is to be played as a sharp or flat. The time notation 44 indicates to the reader how many beats per measure are to be played in that song. The music is read from left to right, with horizontal placement of the notes indicating their temporal relationship, and the vertical placement indicating pitch. This system of notation is used with a variety of musical instruments, including keyboard instruments. FIG. 2 depicts a prior art keyboard with white keys 32 and black keys 34. The pitch associated with each of the keys is noted in FIG. 2.

Figure 3:
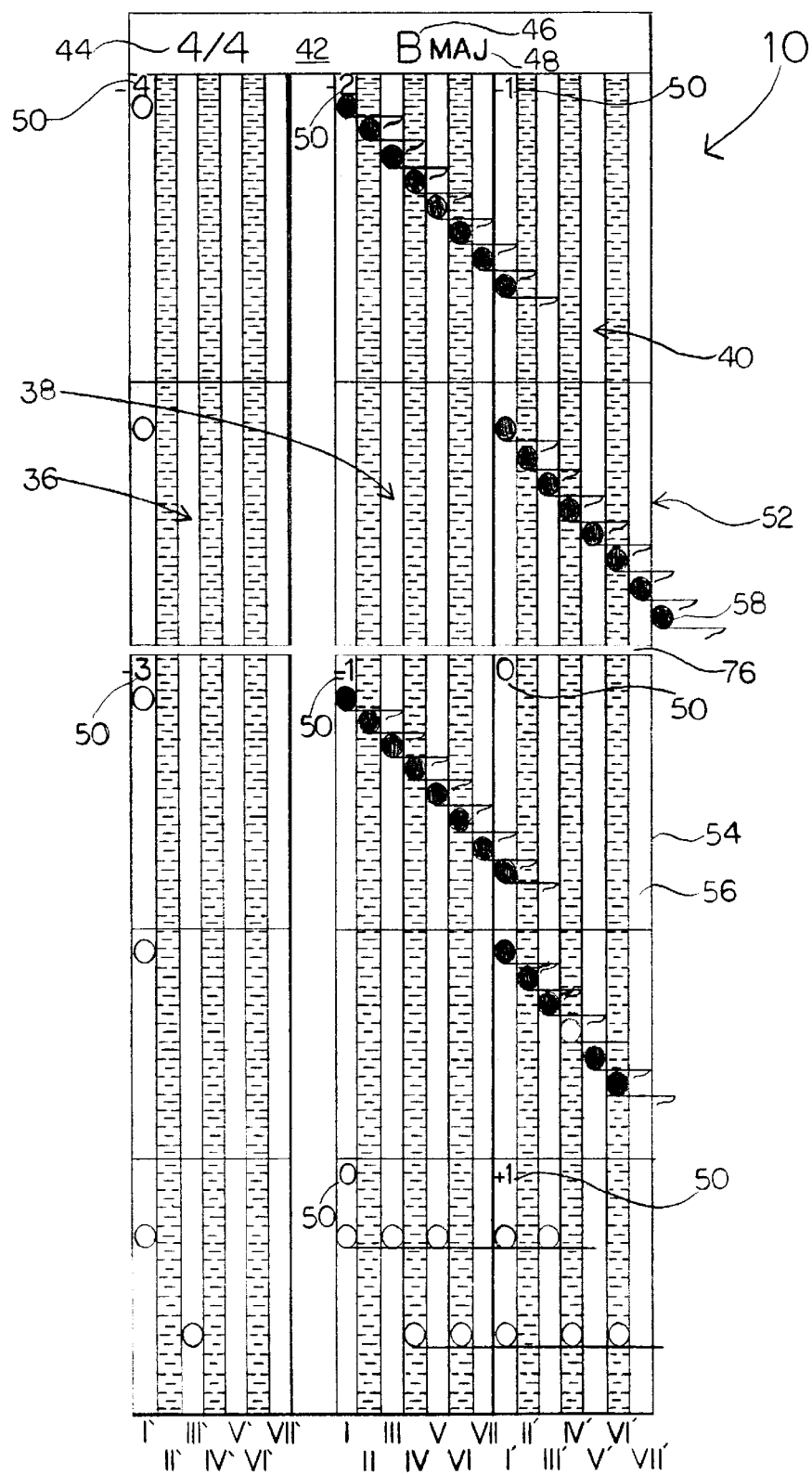
FIG. 3 shows a diatonic music staff in the Key of B major.

FIG. 3 is a depiction of one version of the best mode of the scale-based music notation system. Like the prior art grand staff 12 in FIG. 1, the scale-based music notation system can consist of a grand staff as shown at 10 in FIG. 3. The grand staff in this case consists of a bass staff 36, a treble staff 38, plus an additional staff 40 connected by header 42. Within header 42 is included time notation 44, Key notation 46 and mode notation 48. Octave notations 50 are displayed at the top of each measure 52. When an octave change occurs, there is a measure break 76 in the staff. This provides a further visual indication to the reader of an octave change. Lines 54 and spaces 56 are oriented vertically in each staff so that each staff contains 8 lines 54 and seven spaces 56. Three of the spaces 56 in each staff are shaded to correspond with the dark keys of the keyboard. The same symbols for notes 58, rests, timbre and loudness are used in this staff as in the prior art staff.

When a musician begins to play a piece of music written in the scale-based music notation system, he reads the music from top to bottom. In the header of the music, he notes the beats per measure 44, the Key 46, and the mode 48. Other headers can appear throughout the music as changes in beats per measure, Key, or mode occur throughout the piece. Although FIG. 3 shows a single grand staff, which comprises three staves in this case, more than one column of grand staves can be depicted on a page. Each of these columns would be vertical, and side by side. The reader would begin at the upper left of the page, read down a column (staff), shift to the top of the next column (staff) to the right, and read down that column. This would be repeated for as many staves or grand staves appeared on a page.

When the scale-based music notation system is used in conjunction with a Simplified Keyboard and Electronic Musical Instrument, of Johnson and Pawlowski, then Key and mode, as well as the changes in these parameters throughout the piece, would be programmed in before the user started to play the piece. These changes would be performed sequentially under control of the musician as the piece is played, allowing the musician to focus mostly with depressing the correct keys for the notes indicated by the music.

The light and dark spaces of each of the staves has a direct graphical correlation to the light and dark keys of the Johnson and Pawlowski keyboard. When a user begins playing, he could immediately recognize which key of the keyboard is to be played by merely looking at the horizontal position of notes on the staff. The vertical position of notes on the staff indicate the temporal relationship between notes, just as the horizontal relationship of notes in the prior art staff is an indication of temporal relationships. The same system of note symbols and rest symbols would be used with the scale-based notation system as with the prior art notation system. The notes 58 which are displayed in FIG. 3, when played result in the same series of tones as the notes 58 of FIG. 1.

In the upper left hand position of each staff there is located an octave notation 50. Throughout the musical piece, when a new number appears as an octave notation 50, the user will be apprised that the notes depicted in that measure correspond to the octave indicated by the octave notation 50. At each octave change, a break between measures 76 appears, which serves as a further visual signal of an octave change.

FIG. 4 is a depiction of a seven key pattern 60 of a typical keyboard of the Johnson Pawlowski invention consisting of keys of two types. Typically keys 62, 64 and 66 would be black keys, and keys 68, 70, 72 and 74 would be white keys. These seven keys can be labeled I through VII, as in FIG. 4. These seven Key positions and their octaves correspond to the seven spaces of staves of the grand staff of the scale-based music notation system.

Figure 5:
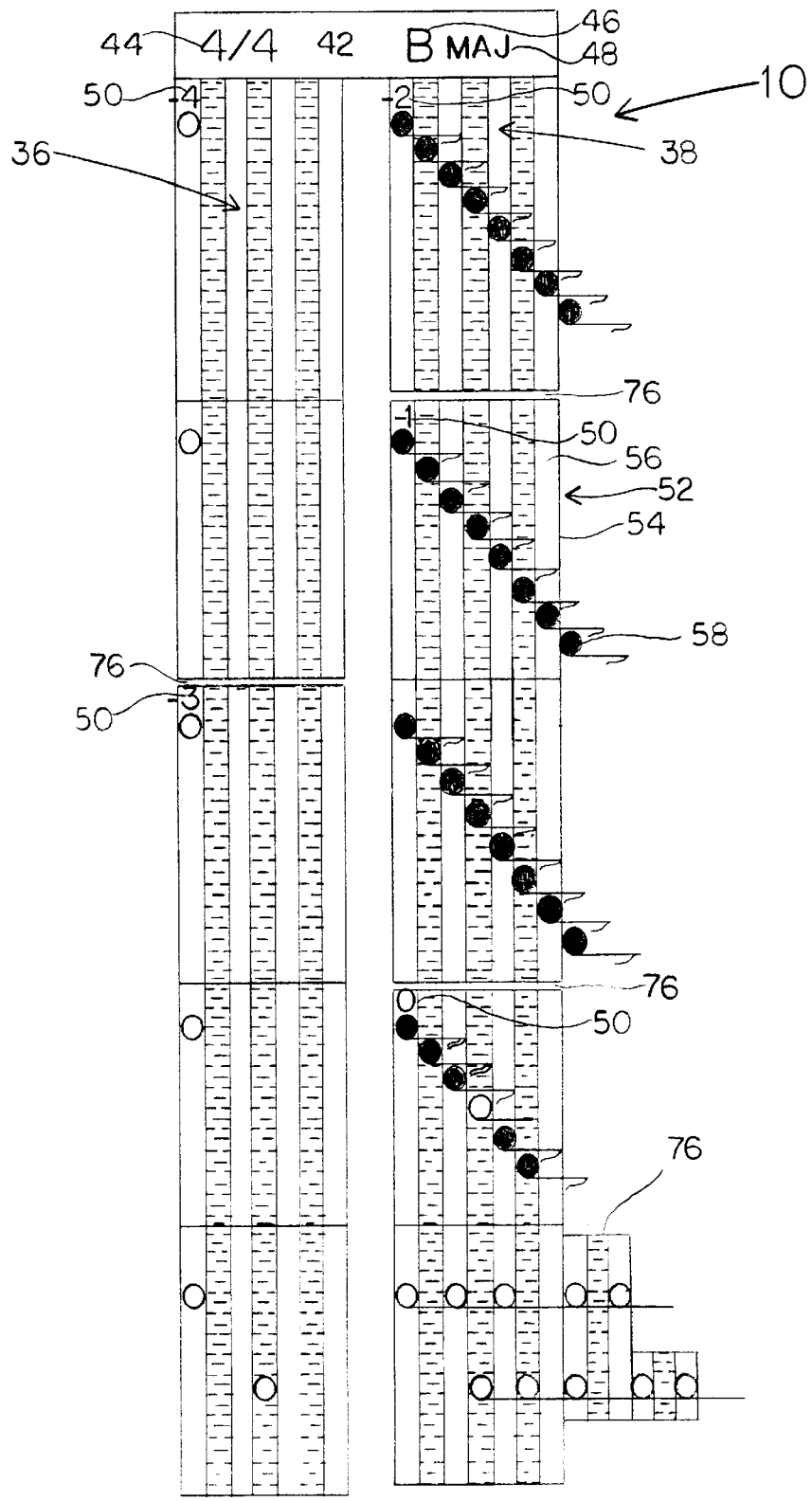
FIG. 5 shows a diatonic music staff in the Key of B major with added staves.

FIG. 5 depicts another version of the best mode of the scale-based music notation system. The music depicted in FIG. 5 consists of the same tones, duration, and timing as the music of FIG. 1 (prior art music notation system), and FIG. 3. FIG. 5 differs from FIG. 3 in that the grand staff 10 consists of only two staves, a base staff 36 and a treble staff 38 joined by a header 42. The header 42 of FIG. 5 contains the same information as the header 42 of FIG. 3: Time notation 44, Key notation 46 and mode notation 48. The version of the scale-based music notation system depicted in FIG. 5 also contains octave notations 50, measures 52, lines 54, spaces 56 and notes 58 and measure break 76. The octave notations 50 in FIG. 5 have been modified to reflect the use of only two staves in this version of the grand staff. Additional lines and spaces have been added at 76 to illustrate how this wide spread of notes could be depicted.

In the best mode of the present invention, the musical notation system consists of at least one staff of eight vertical lines with seven spaces. Each space corresponds to the keys of an electronic keyboard, as disclosed in Johnson and Pawlowski, application Ser. No. 08/623,485. Each possible note of a scale is represented by a space between two lines. As shown in FIGS. 3 and 5, the black keys are represented by gray shaded spaces, or other representations of the black or colored keys.

In the best mode of the current invention, the lines of the staff are such that the placement of a note on the staff can be in any of the spaces which represent the seven keys of the diatonic scale. The octave changes are noted at 50, as shown in FIG. 3, and notes which occur in higher or lower octaves than those indicated at 50 are shown by the displaying of multiple scales, as shown in 76, FIG. 5. The vertical placement of notes on the staff indicate the temporal relationship of the notes. In this preferred embodiment, the music is read from top to bottom.

As in the prior art grand staff 12 in prior art FIG. 1, one of the staves 14 represents the music generally played by the left hand of a pianist, the other staff, 16 represents music generally played by the right hand.

In this music system, the spaces between the lines do not represent fixed pitches of notes, but instead signify the tones, in order, within the scale. The spaces of the treble staff are numbered from left to right as: I, II, III, IV, V, VI and VII. These correspond to the seven notes of the middle octave of a keyboard as taught by Johnson and Pawlowski, and shown in FIG. 4 as 62 through 74. If the Key signature is shown as C major, I through VII represent the notes C D E F G A B. If the Key is G major, I through VII represent G A B C D E F sharp. The spaces of the staff 40 to the right of the middle staff 40 are numbered I' through VII' and correspond to the next higher octave of the Johnson and Pawlowski keyboard. The spaces of the staff which is at the extreme left of the grand staff 36 are labeled I', II', III', IV', V', VI' and VII' and correspond to the next octave lower than the middle octave of the Johnson and Pawlowski keyboard. The notes can be numbered to indicate which finger of which hand they should be played with. This notation can be in the form of numbers or letters which indicate which hand and which finger are to be used. Other designations for the notes of the staves are also possible, and this nomenclature is not intended to be limiting.

Further information about the Key and mode can be identified on the staff as required without the use of confusing flats and sharps and without ambiguity as to which mode is displayed, e.g., G sharp, mixolydian mode or D melodic minor, etc. Sharped and flatted notes, that is, sharped and flatted relative to the standard semi-tones comprising the Key and mode selected, can still be shown on a note-by-note basis. While the Johnson and Pawlowski keyboard makes no provisions for sharped and flatted notes, this should not be construed as a limitation on the present invention.

While there is shown and described the present preferred embodiment of the invention, it is to be distinctly understood that this invention is not limited thereto but may be variously embodied to practice within the scope of the following claims.

We claim:

1. A music notation system, for graphical representation of a keyboard, and for displaying notes of a selected musical scale, called valid notes, which comprises:

said keyboard which utilizes a repeating pattern of seven keys and is programmed to play only seven valid notes of said selected musical scale; and a staff which is said graphical representation of said keyboard, having a recognizable pattern of positions corresponding to said keyboard, for an adjacent and consecutive display of only said seven valid notes of said selected musical scale in temporal relationship to each other, with only enough display positions for said seven valid notes of any selected musical scale.

2. The music notation system of claim 1 which further comprises means for displaying said selected musical scale.

3. A music notation system for graphical representation of a keyboard, and for displaying selected notes with pitch and temporal relationships, termed valid notes, of selected musical scales which contain seven valid notes, which comprises;

said keyboard which utilizes a repeating pattern of seven keys and is programmed to play only seven valid notes of said selected musical scale; and a staff which is said graphical representation of said keyboard, having a recognizable pattern of seven positions for an adjacent and consecutive display of only said seven valid notes of said selected musical scale of seven notes in temporal relationship to each other, with only enough display positions for said seven valid notes of said selected musical scale.

4. The music notation system of claim 3 which further comprises a staff having a recognizable pattern of positions for an adjacent and consecutive display of five or six notes when a selected musical scale contains five or six notes, in temporal relationship to each other, with only enough display positions for said five or six valid notes of said selected musical scale.

5. The music notation system of claim 3 in which said staff comprises a recognizable pattern of seven positions with a horizontal and a vertical axis, and a horizontal and a vertical placement of a plurality of notes, in which said staff is oriented parallel with said horizontal axis, in which said vertical placement of said notes indicate pitch, and said horizontal placement of said notes indicate a temporal relationship.

6. The music notation system of claim 3 in which said staff comprises a recognizable pattern of seven positions with a horizontal and a vertical axis, and a horizontal and a vertical placement of a plurality of notes, in which said staff is oriented parallel with said vertical axis, and in which said horizontal placement of said notes indicate pitch, and said vertical placement of said notes indicate a temporal relationship.

7. The music notation system of claim 3 in which said keyboard and said staff is comprised of repeating recognizable patterns of seven keys of two types, with said staff comprising positions for said keys, each key of said keyboard represented by a position on said staff.

8. The music notation system of claim 7 in which said staff further comprises a recognizable pattern of seven positions in which said positions are distinctively marked to correspond to each of said two types of keys of said keyboard.

9. The music notation system combined with keyboard of claim 8 in which said keyboard is further comprised of black and white keys, and said staff is further comprised of a recognizable pattern of seven positions in which said positions are distinctively marked to correspond to said black and white keys of said keyboard.

10. The music notation system of claim 3 in which said staff further comprises a means of indicating said selected scale.

11. The music notation system of claim 10 in which said staff further comprises a means of indicating said selected scale by indicating a root note of said scale.

12. The music notation system of claim 3 which further comprises a means by which multiple octaves of notes are displayed.

13. The music notation system of claim 3 which further comprises a means of denoting an octave of the note being played.

14. The music notation system of claim 3 which further comprises a means of denoting a selected mode.

15. The music notation system of claim 3 which further comprises a means of denoting which mode is selected.

16. The music notation system of claim 3 which further comprises a means of denoting beats per measure.

17. The music notation system of claim 3 which further comprises a means of denoting which hand and which finger are to play a particular note.

18. A method of representing music notation which is based on a seven note per scale musical system, for displaying selected notes of selected musical scales which contain seven or fewer notes appropriate to a selected diatonic scale notes, which are called valid notes, which comprises the steps:

providing a keyboard which utilizes a repeating pattern of seven keys and is programmed to play only seven valid notes of said selected; and providing a staff having a recognizable pattern of positions for adjacent and consecutive display of only the seven valid notes of a selected musical scale in temporal relationship to each other, with only enough display positions for said seven valid notes of any selected musical scale.

19. Apparatus for learning and/or teaching the playing of a note of an instrument of the type having a keyboard comprising a repeating pattern of seven black and white keys which is programmed to play only seven valid notes of a selected musical scale, said apparatus comprising:

a sheet of paper with a graphical representation of said keyboard which includes a staff having a recognizable pattern of seven positions which represent said black and white keys of said keyboard, for an adjacent and consecutive display of only said seven valid notes of said selected musical scale of seven notes in temporal relationship to each other, with only enough display positions for said seven valid notes of said selected musical scale.

20. A sheet of music having a graphical representation of a keyboard of the type comprising a repeating pattern of seven keys which is programmed to play only seven valid notes of a selected musical scale, which includes a staff having a recognizable pattern of seven positions for an adjacent and consecutive display of only said seven valid notes of said selected musical scale of seven notes in temporal relationship to each other, with only enough display positions for said seven valid notes of said selected musical scale.

21. A music notation system for graphical representation of a keyboard with black and white notes by said music notation system, and for displaying selected notes with pitch and temporal relationships, termed valid notes, of selected musical scales which contain seven valid notes, which comprises;

said keyboard which utilizes a repeating pattern of seven keys of two types, four keys being white in color, and three keys being black, with said keyboard being programmed to play only seven valid notes of said selected musical scale;

a staff which is said graphical representation of said keyboard, having a recognizable pattern of seven positions for an adjacent and consecutive display of only said seven valid notes of said selected musical scale of seven notes in temporal relationship to each other, with only enough display positions for said seven valid notes of said selected musical scale, with colored positions to represent said black and white keys of said keyboard, said staff having a horizontal and a vertical axis, and a horizontal and a vertical placement of a plurality of notes, in which said staff is oriented parallel with said horizontal axis, in which said vertical placement of said notes indicate pitch, and said horizontal placement of said notes indicate a temporal relationship;

a means of indicating said selected scale by indicating a root note of said scale;

a means by which multiple octaves of notes are displayed;

a means of denoting an octave of the note being played;

a means of denoting a selected mode;

a means of denoting beats per measure; and a means of denoting which hand and which finger are to play a particular note.

* * * * *